US005192031A

United States Patent [19]

Gilbert

[11] Patent Number: 5,192,031

[45] Date of Patent: Mar. 9, 1993

[54] COMBINED TRASH COMPACTOR/CONVEYOR FOR GARBAGE TRUCK

[76] Inventor: Hervé Gilbert, 299, Parc Industriel, Lac-Etchemin Québec, Canada, G0R 1S0

[21] Appl. No.: 726,234

[22] Filed: Jul. 5, 1991

[51] Int. Cl.$^5$ .......... B60P 1/00

[52] U.S. Cl. .......... 241/101.7; 241/235; 100/176

[58] Field of Search .......... 241/101.7, 235; 100/50, 100/94–96, 98 R, 144, 151, 161, 173, 176, 100

[56] References Cited

U.S. PATENT DOCUMENTS

| | | | |
|---|---|---|---|
| Re. 6,728 | 11/1875 | Pease | 100/94 |
| 234,397 | 11/1880 | Field | 241/235 |
| 3,490,706 | 1/1970 | Rogers et al. . | |
| 3,643,591 | 2/1972 | Bragg | 100/176 |
| 3,827,351 | 8/1974 | Rosenow . | |
| 3,889,588 | 6/1975 | Wollersheim . | |
| 3,951,059 | 8/1976 | Morris . | |
| 4,069,929 | 1/1978 | Harker . | |
| 4,401,205 | 8/1983 | Komossa et al. | 100/94 |
| 4,926,749 | 5/1990 | Llinner . | |

FOREIGN PATENT DOCUMENTS 1274415 9/1990 Canada .

*Primary Examiner*—Frank T. Yost
*Assistant Examiner*—Allan M. Schrock
*Attorney, Agent, or Firm*—Pierre Lespérance; Francois Martineau

[57] ABSTRACT

A trash compactor for use within the box of an automotive garbage truck, comprising: (a) a pair of conveyors arranged in a V-shape laid on its side, the first conveyor being horizontal and supporting and moving a trash load from a trash loading area, through a trash compacting area, to a compacted trash unloading area, the second conveyor being inclined upwardly. A plurality of crushing plates are axially carried by rotatable shafts transversely of each conveyor, for crushing trash at the trash compacting area which is at the apex of the conveyors V-trough. The top run of the second conveyor transfers compacted trash from the compacted trash unloading area to a trash storage area within the box; wherein compacted trash will by evenly distributed within the box trash storage area of the garbage truck, for efficient use of available space.

1 Claim, 6 Drawing Sheets

COMBINED TRASH COMPACTOR/CONVEYOR FOR GARBAGE TRUCK

FIELD OF THE INVENTION

The invention relates to trash compacting units for use in the box of a garbage truck.

BACKGROUND OF THE INVENTION

In order to improve efficiency in collecting garbage, municipalities have mounted trash compactors within the box of their automotive garbage trucks. These compactors include a powerful ram operated hydraulic press, carrying a large end panel. The press reduces the volume of collected refuse by compressing it against the rear flooring corner of the truck box. Such volume reduction increases the efficiency of resource allocations during garbage collection operations.

More particularly, these garbage truck boxes include a rear cavity enclosing a hopper, for loading refuse and for flattening it thereagainst. Thereafter, this load of flattened trash is moved forwardly into the box by displacing the hopper to a predetermined position where the hopper is then unloaded. A problem associated with such a known system is that trash tends to build up at the rear unloading area within the garbage truck box, to eventually clog same well before all the available inner loading space of the box is used. Indeed, there is no means to specifically distribute the flattened refuse evenly within the box, i.e. forwardly of the trash unloading area within the box.

Among the relevant art in the field of trash compactors, it is known to use two pairs of counterrotating shearing discs forming a V-shape wedge member, for crushing within the V-trough trash material. The large top mouth of these V-wedges is fed with trash under gravity, and is progressively crushed in a downward direction to eventually escape through a narrow channel at the bottom apex of the V-wedge. This is clearly shown in U.S. Pat. No. 3,490,706 issued in 1970 to Rogers, as well as in U.S. Pat. No. 3,951,059 issued in 1976 to Drew-it corp. Furthermore, to prevent damage to the compacting machine, pressure relief means have been developed to temporarily release the bias directing the two pairs of crushing arms one toward the other, upon extremely hard uncrushable material engaging therein: see for instance U.S. Pat. No. 3,827,351 issued in 1974 to Ecology Recycling inc., and U.S. Pat. No. 4,069,929 issued in 1978 to Wisconsin Alumni Research inc.

However, these state of the art references have all the same drawbacks: they do not address the particular problem of distribution of the compacted refuse once it escapes from the compacting unit. The conventional trash compactors undesirably crush rather than flatten the trash material, particularly plastic bottles and metallic cans; volume reduction by flattening can be greater than through crushing. The compaction ratio still remains quite low-typically a 2:1 ratio (about 50% of initial volume), for a given power output of the compactor.

OBJECTS OF THE INVENTION

An important object of the invention is therefore to provide a compactor unit for a garbage truck, having integral means for even distribution of refuse within the box of the truck.

Another important object of the invention is that the compactor unit be able to flatten rather than crush at least some specific types of trash material including plastic bottles and metallic cans.

A further important object of the invention is that the compactor unit have a much higher efficiency in compacting trash, preferably at a 5:1 ratio of volume of trash before and after compaction.

A corollary object of the invention is that the compactor unit can be mounted to a conventional garbage truck with little modifications brought thereto, at a low cost.

SUMMARY OF THE INVENTION

Accordingly with the objects of the invention, there is disclosed a trash compactor for use within the box of an automotive garbage truck, comprising:

(a) conveyor means, for supporting and moving a trash load from a trash loading area, through a trash compacting area, to a compacted trash unloading area;

(b) crushing means, for crushing trash at said trash compacting area; and (c) transfer means, cooperating with said crushing means for transferring said compacted trash from said compacted trash unloading area to a trash storage area within said box; wherein compacted trash will be evenly distributed within said box trash storage area of the garbage truck, for efficient use of available space.

DETAILED DESCRIPTION OF THE INVENTION

Figure 2:
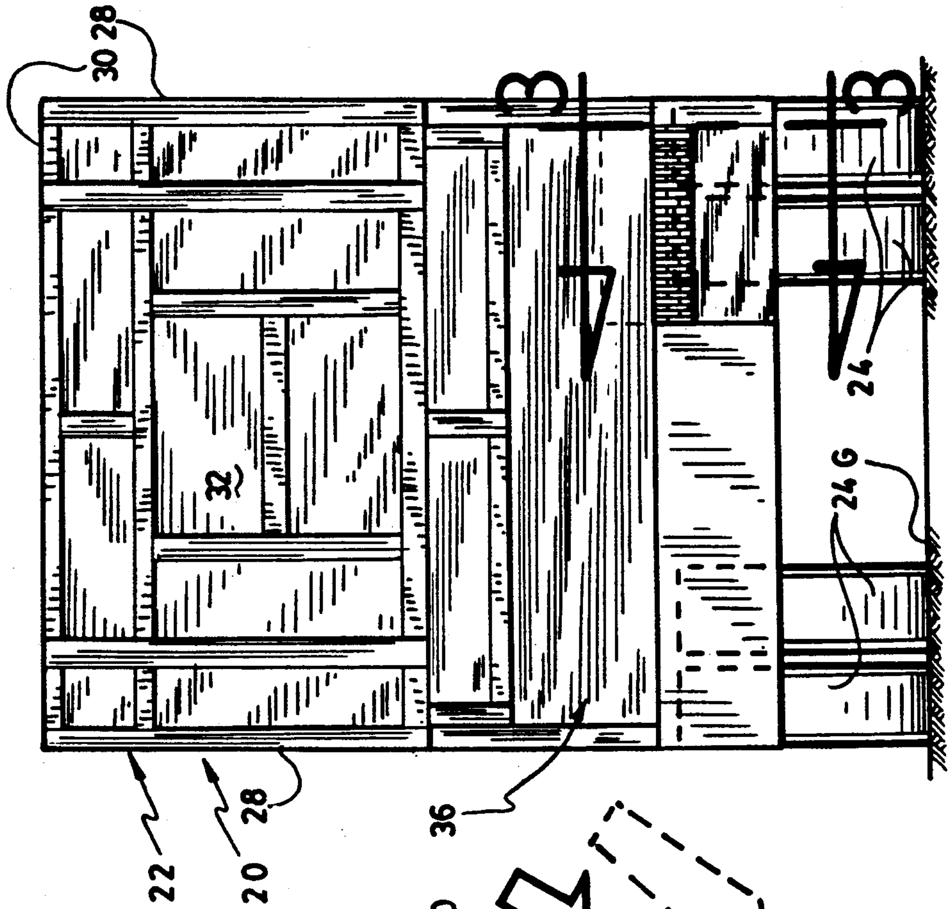
FIG. 2 is a rear end elevation of the truck of FIG. 1.
Figure 1:
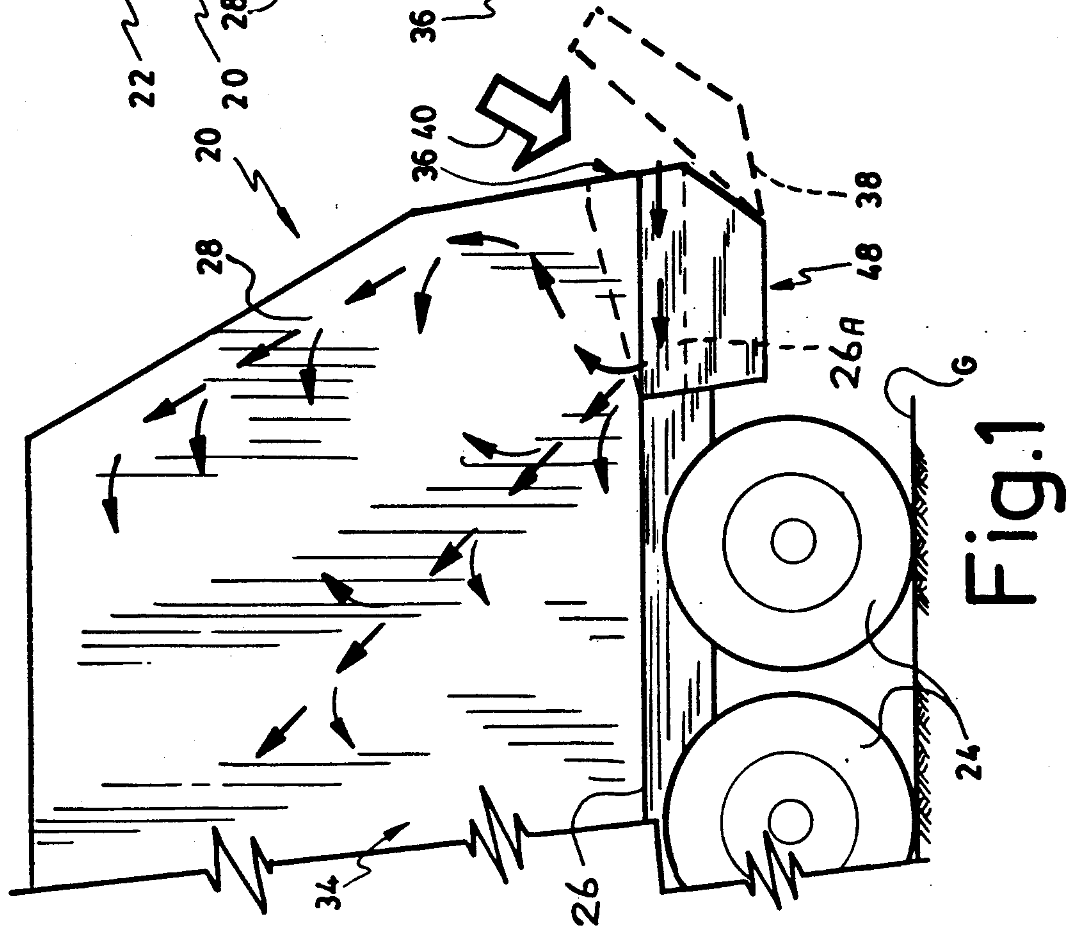
FIG. 1 is a side elevational view of the rear end of an automotive trash compacting truck, schematically illustrating the path of travel within the truck box, of trash fed into the rear feed hopper and submitted to the bias of a combined trash conveying and crushing means (not shown in FIG. 1) according to the teachings of the invention.
Figure 8:
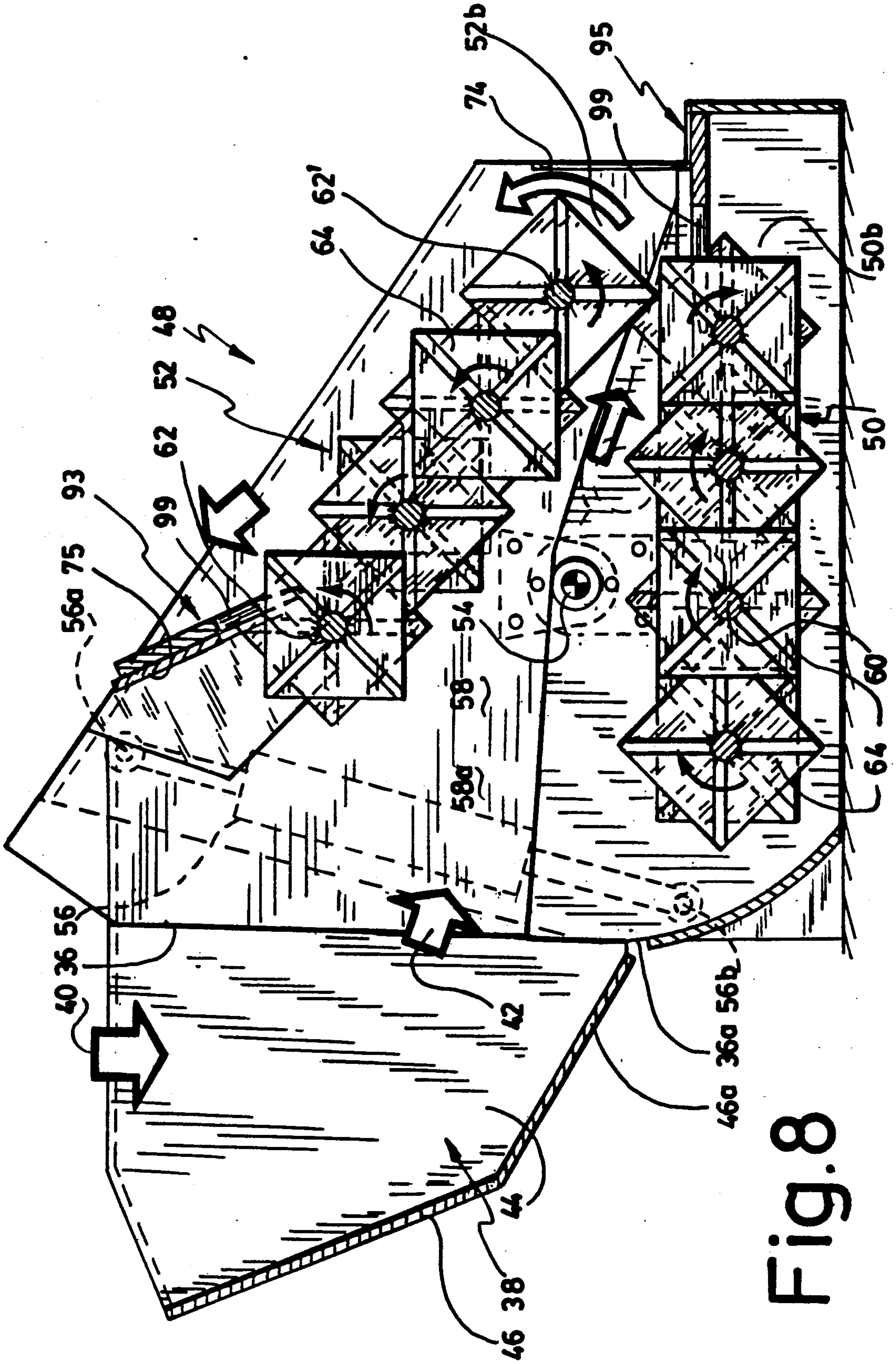
FIG. 8 is a vertical sectional view taken along line 8—8 of FIG. 7.

As shown in FIGS. 1-2 and 8, garbage truck 20 defines a large box 22 carried over ground G by wheels 24. Box 22 defines a flooring 26, side walls 28, a top wall 30, a rear wall 32 and a front wall (not shown) enclosing a large trash loading chamber 34. A lower section of rear wall 32 is cut out to define a trash-loading aperture or mouth 36, wherein trash may be fed into chamber 34 therethrough. Usually, there is provided a hopper member 38 that rearwardly upwardly projects from the bottom edge of mouth 36, wherein a first forwardly downwardly inclined trash passageway or channel (arrow 40) is defined to facilitate loading of trash through mouth 36 (arrow 42).

As illustrated, hopper 38 preferably consists of two opposite upright side walls 44, edgewisely carried by the rear edge of the box side walls 28, and supporting a steep rearmost ramp 46 therebetween. A ramp extension 46a making a smaller acute angle with the horizontal axis relative to ramp 46, extends toward and up to the lower edge 36a of mouth 36.

Figure 3:
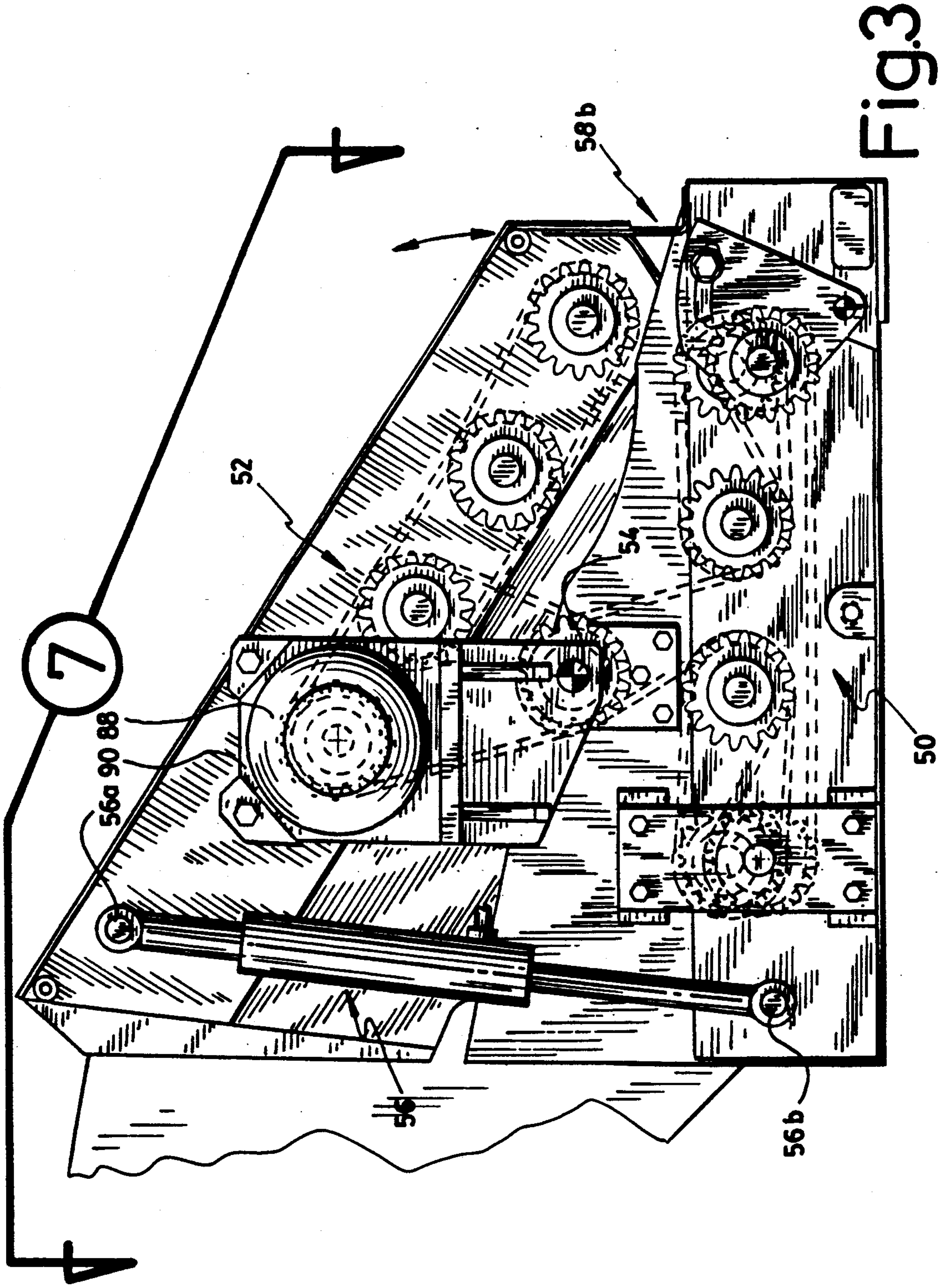
FIG. 3 is an enlarged vertical sectional view of the rear end portion of the truck of FIG. 1, taken along line 3—3 of FIG. 2, partially showing the combined trash conveying and crushing means of the invention.

Accordingly with the invention, a cut-out 26a is made in the rear portion of flooring 26, and an apparatus for conveying and crushing trash, referenced 48, is fitted thereabout. Apparatus 48 is best illustrated in FIGS. 3 and 8, and consists essentially of first and second elongated frame members 50, 52. Each frame 50, 52 forms a large, box-like, sturdy, rigid housing, being opened at their main top and bottom faces. First frame member 50 is anchored to box 22 and extends horizontally within chamber 34 in a fore and aft direction at least partially beneath the level of flooring 26. Second frame member 52 extends in the same vertical plane as first frame member 50, overlying same. Second frame member 52 is pivotally mounted by a pivot means 54, at an intermediate section thereof, to fixed frame 50, for pivotal relative displacement of frame 52 within the common vertical plane of frames 50 and 52. Thus, pivot 54 is horizontal and extends transversely of box 22. Ram means 56, preferably a pair of hydraulic rams, interconnect the rear ends of frames 50 and 52, at pivot mounts 56a, 65b, for controllingly biasing pivotal displacement of upper frame 52 about pivot 54 relative to lower frame 50. Rams 56 exert a constant pressure.

Figure 15:
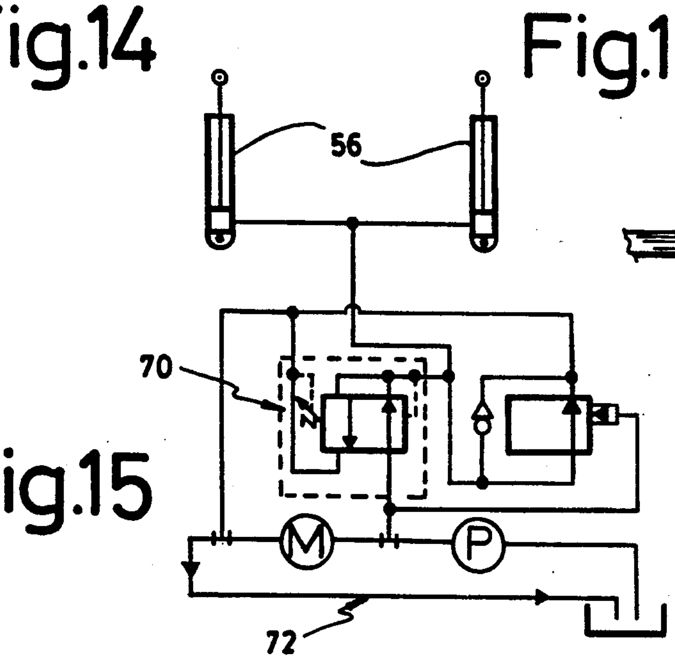
FIG. 15 is a schematic view of a hydraulic network constituting the enabling part of a pressure relief means for the trash conveyor crushing means of the invention.
Figure 10:
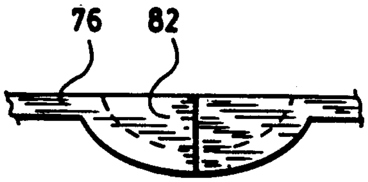
FIG. 10 is a corner edge view of the plate of FIG. 9.

Ram means 56 is biased to an extended condition by a hydraulic feed means, FIG. 15, wherein the first and second frames rear ends 50a, 52a become vertically substantially spaced apart and pivotable upper frame 50 becomes rearwardly downwardly inclined, preferably by about 30°, while the frames front end 50b, 52b become closely spacedly proximate to one another. Hence, a jaw member forming a V laid on its side is defined, having a corresponding V-throat 58 whose wide end 50a, 52a forms a mouth 58a spacedly coextensive with mouth 36. Hence, trash fed into hopper 38 will engage into V-throat 58 through mouths 36 and 58a.

Lower frame 50 includes a number of coplanar rotatable shafts 60, and upper frame 52, a number of coplanar rotatable shafts 62, shafts 60 and 62 being parallel to pivot axle 54. Each shaft 60, 62 is axially provided with a plurality of laterally spaced apart, polygonal, rigid plate members 64. Plates 64 are centrally anchored to their shaft 60 or 62 and occupy a plane orthogonal thereto. Plates 64 of successive pairs of shafts 60 or 62 are laterally offset from one another (see FIG. 7), wherein they intermesh to enable the successive shafts 60 or 62 to come closer to one another. First drive means 66 rotates lower shafts 60 and associated plates 64 in a clockwise direction, i.e. with these plates top portion moving in a frontward direction. Second drive means 68 rotates upper shafts 62 and associated plates 64 in a counterclockwise direction, i.e. in a direction opposite that of shafts 60.

Hence, the rotating plate 64 of the horizontal lower frame 50 constitutes at their top leg a conveyor means for displacing to the rear of apparatus 48 trash fed from hopper 38 into throat 58. The V-shape throat 58 then forms a forward wedge means, that will progressively flatten trash moved to the rear of apparatus 48 by trash-supporting and conveying conveyor 50. The lower leg of counter-rotating plates 64 of upper frame 52 further prevents backflow of trash upon build up of trash at the vertically narrow fore end 58b of throat 58, by again biasing trash toward end 58b.

To prevent damage to apparatus 48, in case a non-crushable trash material engages throat 58, pressure relief means 70 are provided to the hydraulic network 72 of ram means 56 (FIG. 15) to progressively reduce hydraulic pressure to ram 56, and the latter accordingly yieldingly retracting when the ram retraction load sustained exceeds a set threshold value. The greater the ram retraction overload, the greater the reduction of hydraulic pressure induced by means 70. This in turn will pivot frame 52 counterclockwise, increasing the clearance between ends 50a, 52a for free passage of said non crushable material through the downstream end of the V-shape unit 50, 52. Upon the uncrushable material escaping from the present crushing apparatus, pressure relief means 70 will automatically return hydraulic pressure to its maximum set value. It is also understood that, should the hydraulic means become inoperative, the ram 56 will retract, thus automatically preventing damage to apparatus 48 even if the operator is unaware of the disfunction of the ram hydraulic means.

An upright stopper wall 74 is anchored to flooring 26, parallel to shafts 60, 62, forwardly of the frontmost upper shaft 62' in horizontal register with the front trash outlet 58b of V-throat 58. Stopper 74 biases crushed trash escaping from narrow fore throat outlet 58b and striking plate 74, into an upward direction, which is then further biased rearwardly over the top of frame 52 by the counterrotating plates 64 of rearmost rotating shaft 62'. Hence, the upper leg of the rotating plates 64 of upper jaw 52 constitutes an upwardly rearwardly directed second trash conveyor means. An unloading ramp 75 is anchored at the top of conveyor 52 to the box 28, coextensively to the upper run of conveyor 52. Plate 75 is steeper than conveyor 52, e.g. at about 45° to the horizontal compared to 30° for conveyor 52, to induce fall-out of the conveyed trash slopewisely rearwardly toward flooring 26 and box rear wall 32, along a travel path overlying the top edge of upright plate 74.

Preferably, a comb assembly 93, 95 of the "escalator comb" type is installed at the downstream ends of each conveyor means 50, 52, respectively, to prevent conveyed trash from falling beneath the conveyors beyond their downstream end. By "downstream" ends of conveyor means 50, 52, we mean to say the trash discharge end of each conveyor system for trash elements carried by the upper run of each conveyor. Thus, the downstream end of lower conveyor 50 is at the far right of FIG. 8, in register with bottom comb means 95, and the downstream end of upper conveyor 52 is at the far left of conveyor 52 in same figure, in register with upper comb means 93.

Figure 7:
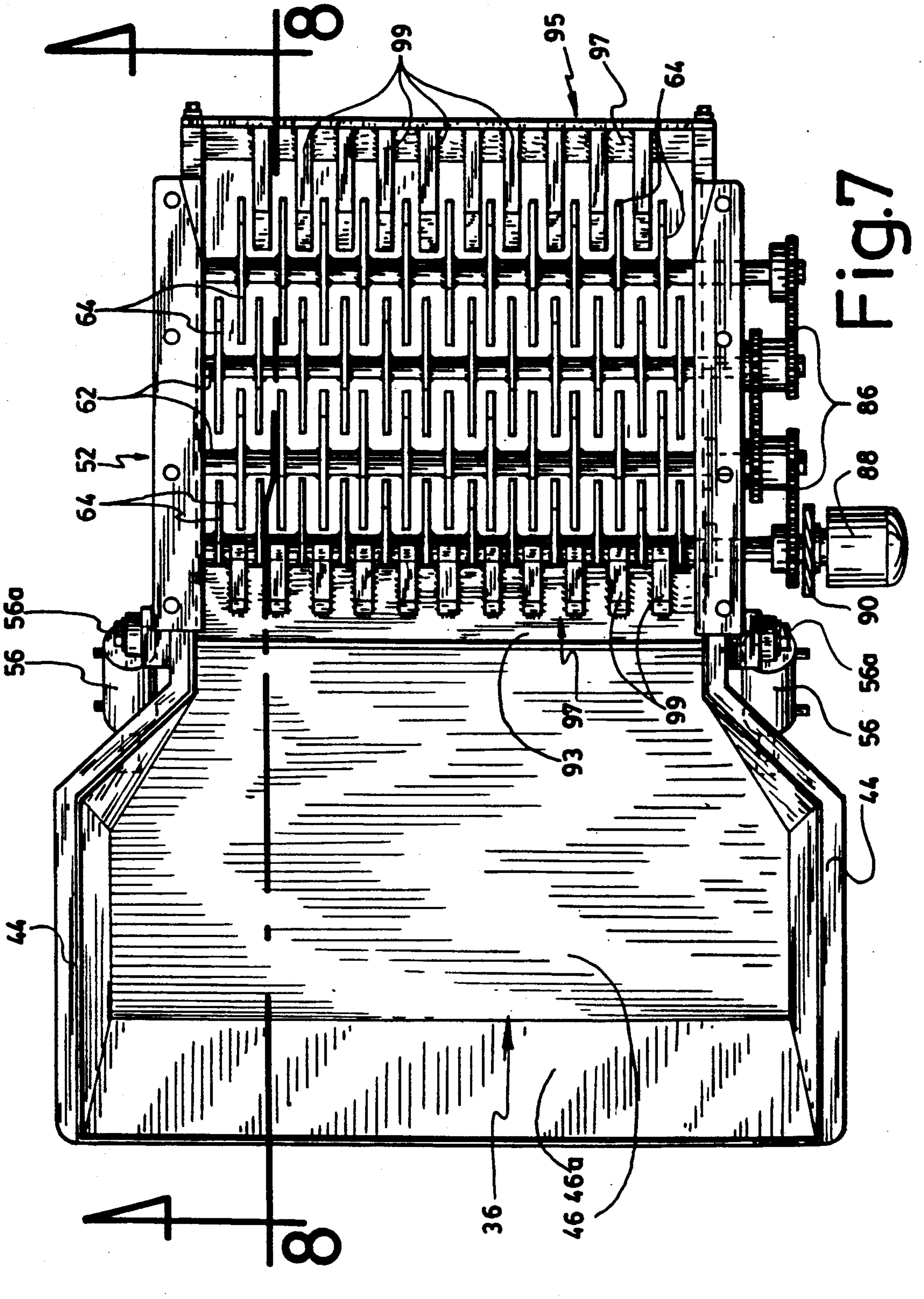
FIG. 7 is a top plan view of FIG. 3.

Comb assemblies 93, 95 are best illustrated in FIGS. 7–8 and each consists of a main elongated support housing 97, laterally bridging the corresponding frame 50 and 52 and anchored thereto, and from which transversely depend a plurality of spaced fingers 99. Fingers 99 are transversely offset relative to the plates 64 carried by the most proximate spaced rotatable shaft 60 or 62, so as to intermesh therewith. Hence, due to this relative intermeshing between the plates 64 of successive pairs of shafts 60 or 62 and to the intermeshing of the comb fingers 99 with the plates 64 of the most proximate corresponding shaft 60 or 62, no trash material of any significant volume will be able to undesirably fall transversely through the conveyor means 50 or 52 (this would of course clog the apparatus).

The second trash conveyor means 52 will promote the evenness of distribution of trash into box trash storage chamber 34, as can be readily appreciated by those skilled in the art upon perusal of the schematic illustration in FIG. 1 (multiple arrows).

Conveyor 52 moves trash toward the rear wall 32 of the garbage truck box, as suggested in FIG. 1. Due to the slope of the upper run of conveyor 52, at least some trash material will, at the beginning when the garbage truck box is empty, fall downwardly at the lower (frontward) end of conveyor 52, over and beyond the top edge of upright plate 74, to fall rearwardly slopewisely onto box flooring 26. Upon trash building up on flooring, it will eventually abut against the front upright wall of the garbage truck box, and its level will eventually reach that of the lower end of second conveyor 52. Then, the accumulated trash on the floor will constitute an abutment surface for trash escaping from unloading area **52*b*, whereby this trash will be conveyed progressively more upward along the second conveyor means 52, to reach a level overlying the adjacent level of refuse having build up on flooring 26. Because of the slope of conveyor 52, and with trash loading levels increasing, trash unloading therefrom at a progressively increasing height thereof will bias the trash resting on the flooring 26 to slide forwardly downwardly above plate 74. Indeed, the upper run of conveyor 52 is upwardly rearwardly directed, i.e. in a direction opposite the trash loading area on flooring 26 which is forward of upright plate 74. This in turn will reactively promote an "avalanche" type trash fall-out each time a further trash load escaping from unloading area 52*b* is carried upwardly rearwardly by the top run of conveyor 52**.

Figure 9:
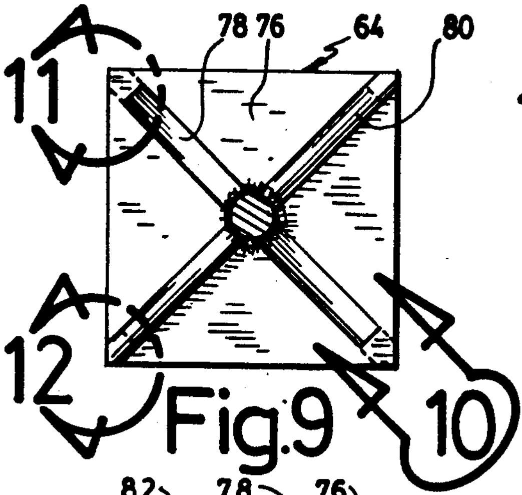
FIG. 9 is an enlarged plan view of one of the trash crushing quadrangular plate members.
Figure 11:
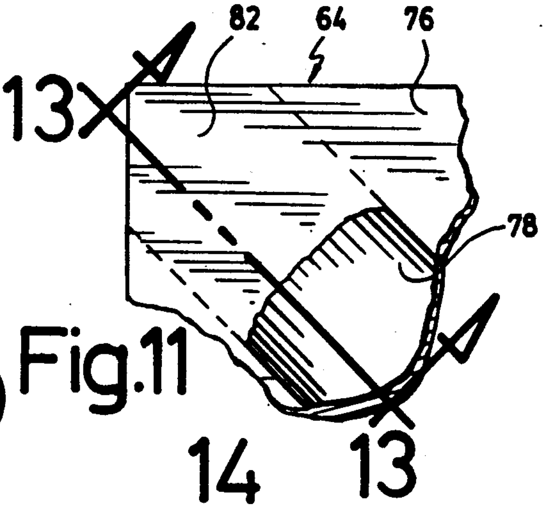
FIGS. 11-12 are enlarged top plan views of two successive corners of a trash crushing plate.
Figure 13:
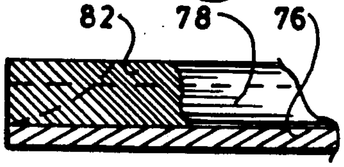
FIG. 13 is a cross-section about line 13—13 of FIG. 11.
Figure 12:
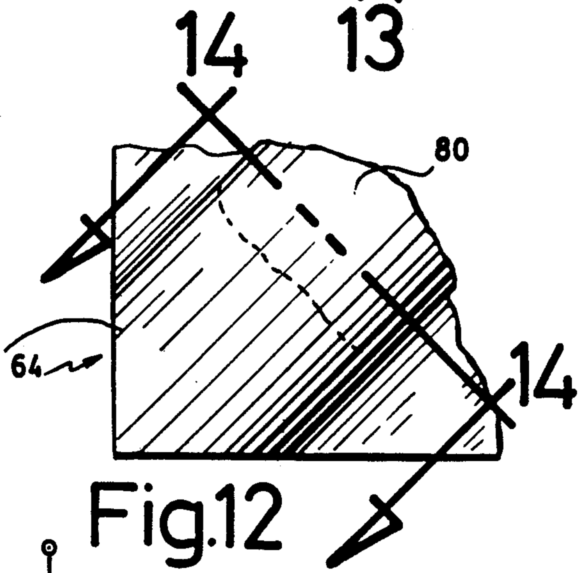
Figure 14:
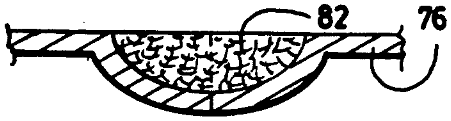
FIG. 14 is a cross-section about line 14—14 of FIG. 12.

As illustrated in FIGS. 9–14, each plate member 64 preferably consists of a thin rigid square plate 76, with two diagonal punch lines 78 and 80 forming thereacross (FIG. 9). Punch line 78 defines a concave groove, while punch line 80 defines a convex ridge, when plate 76 is views from one face thereof, and vice-versa if viewed from the opposite side. The four ends of lines 78 and 80 at the corners of square plate 76, are each filled with a hardened material, e.g. tungsten 82, to extend the useful lifetime of plates 76. Indeed, during plate induced trash crushing, the four corners of each plate 76 will edgewisely successively contact the trash so as to be subjected to severe strain.

Plates 76 are parallel to each other and closely spaced apart, thereby constituting discontinuous trash conveying surfaces on their top edges. Moreover, the plates 76 also constitute excellent trash crushing implements, being extremely resistant since the edgewise crushing load edgewisely applied thereto is substantially within the plane of the plates 76; thus, the main load will be sustained by the shafts 60, 62, which can be of very sturdy construction (substantial width and hard material).

Figure 4:
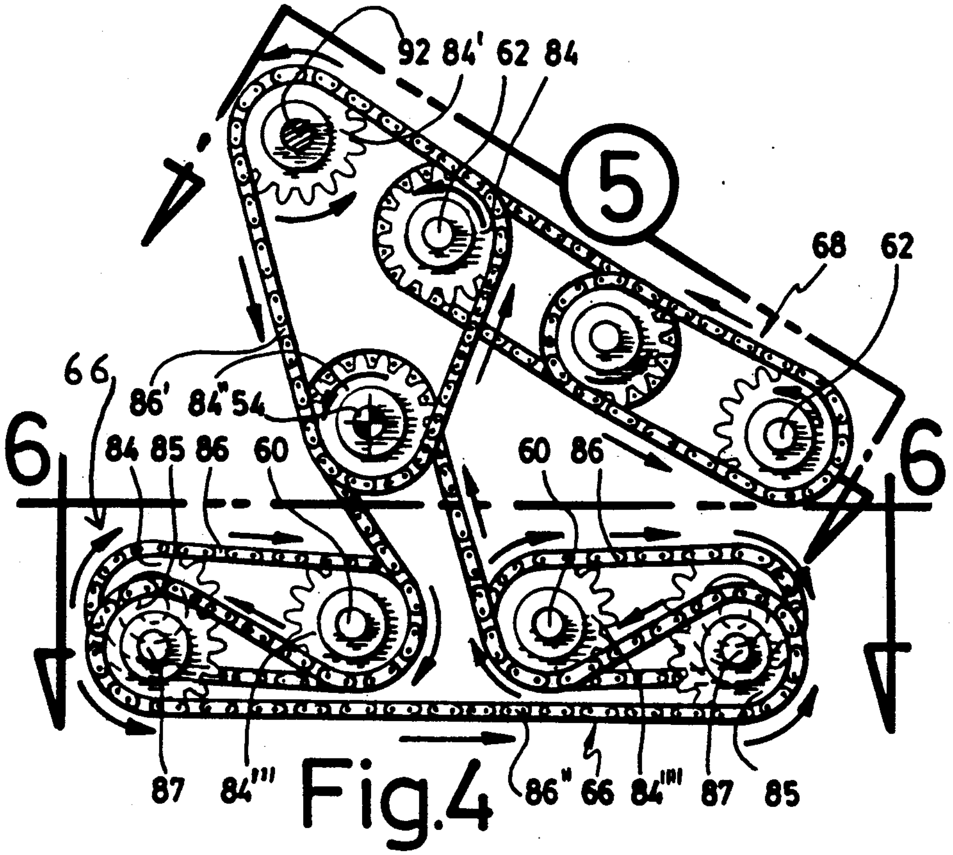
FIG. 4 is a schematic side elevational view of the combined trash conveying and crushing means of the invention.
Figure 5:
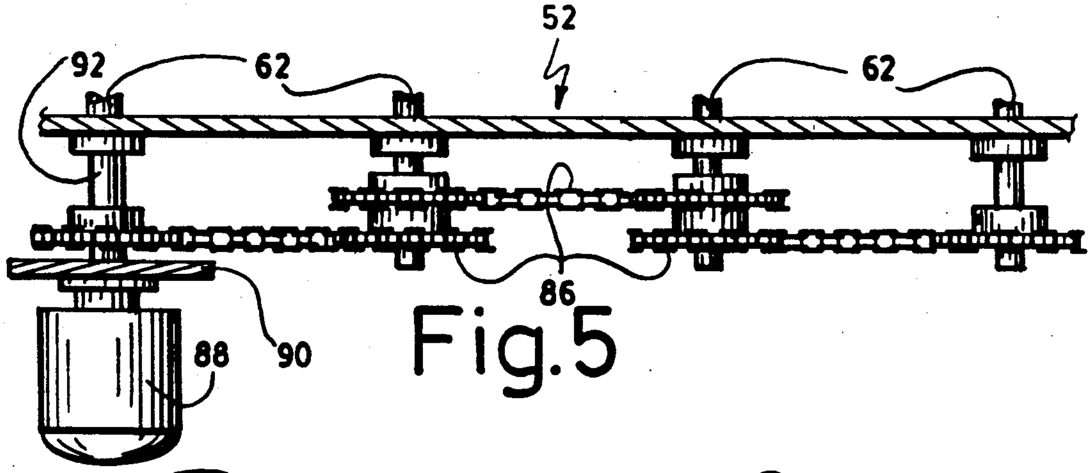
FIG. 5 is an enlarged, top end view thereof taken about perspective 5 of FIG. 4.
Figure 6:
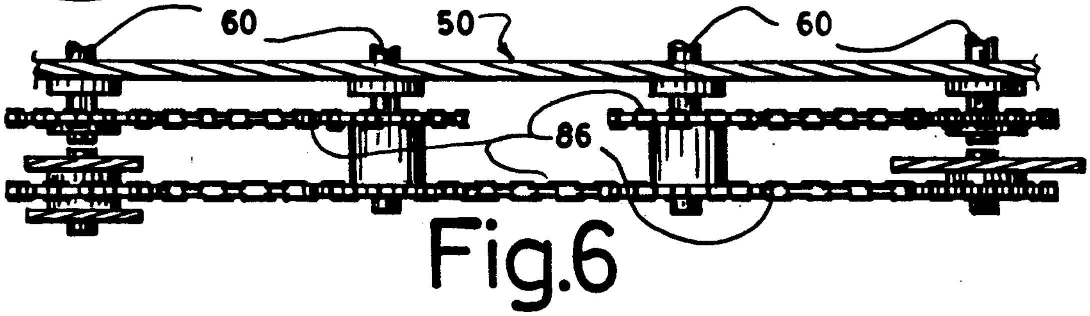
FIG. 6 is a horizontal cross-sectional view taken along line 6—6 of FIG. 4.

A preferred embodiment of first and second conveyor drive means 66, 68 is illustrated in FIGS. 4–6. Each shaft 60, 62 is provided with double-rimmed end sprockets 84 axially carried by same. Each pair of successive shafts 60 have sprockets 84 about a common vertical plane, and each shaft 60 adjacent a pair of successive shafts 60 has a sprocket 84 about a plane offset from the plane of the said adjacent pair of successive shafts. Each pair of vertically registering sprockets 84, 84 and 86, 86 at each end of a pair of successive shafts 60, 60 and 62, 62 respectively, are meshingly interconnected by a corresponding chain 86, 86, the various chains 86 being horizontally offset as suggested in FIGS. 5–6. A chain tensioner (not shown) may be added, to suitably adjust the tension of each chain around its shaft sprockets. A hydraulic motor 88 is further provided, being anchored to an anchor panel 90 itself anchored to box 22, and having a drive axle 92 carrying a single rim sprocket 84′. Preferably, drive axle 92 axially merges with the uppermost shaft 62, i.e. at the downstream end of inclined conveyor 58. This is because the downstream end of conveyor 52 is the area where torque bias of the crushing apparatus is allegedly the greatest. In such a case, a longer drive chain 86′ meshingly interconnects the radially outward run of drive sprocket 84′ with the radially outward run of a proximate successive sprocket 84 from upper frame member 52 and with the upper run of another double rim sprocket 84″, the latter mounted intermediate frames 50 and 52 and being axially carried by pivot axle 54. Another longer chain 86″ will then transmit rotational torque from drive sprocket 84′, through chain 86′ and idle sprocket 84″, to the sprockets 84 of the lower conveyor 50.

More specifically, elongated chain 86″ will engage the radially inward runs of two successive double rim sprockets 84‴, 84⁗, mounted to shafts 60 and the radially outward runs of two additional spaced sprockets 85, 85 carried by idle shafts 87, 87 which are anchored to frame 50 and positioned on opposite exterior sides of sprockets 84‴, 84⁗. Hence, sprockets 84‴, 84⁗ will counterrotate relative to pivot axle sprocket 84″, and thus, relative to drive sprocket 84′, wherein all the chained sprockets 84 of lower jaw member 50 will counterrotate relative to the chained sprockets 84 of upper jaw member 52. Therefore, the conveyor elements 64 of lower conveyor 50 will move in an opposite direction than the conveyor elements 64 of upper conveyor 52. This is clearly illustrated by the various chain arrows in the partly schematic view of FIG. 4.

It is understood that all said sprockets are axially anchored to their shafts, except for sprocket 84″ of pivot axle 54 and sprockets 85, which are free to rotate thereabout. To prevent possible shearing action of the lower runs of chains 86″ against the two chains 86 of lower frame 50, it is envisioned to offset slightly downwardly the shafts 87 of the former relative to the shafts 60 of the latter, as clearly illustrated in FIG. 4.

The rotation reversing means will reverse the direction of rotation of shafts 60 relative to shafts 62, in the conventional fashion (FIGS. 4, 6).

With the present trash compacting apparatus, plastic bottles and metallic cans are flattened, while glass containers are shattered. The present compactor will reduce trash volume of typical trash material by an average of about 80% of initial trash volume. This compares favorably with the 50% volume reduction obtained with the conventional garbage truck hydraulic compacting panel member. The present compactor is envisioned for use preferably with an automotive vehicle, but could also be mounted into a stationary trash storage container.

The present compactor can be used to modify at low cost the new garbage recycling type garbage trucks, having up to five distinct sorting compartments in which sorted trash material is selectively fed. These new trucks are very costly. With our apparatus, the only modification is at the rear portion of the flooring, where the frames 50, 52 are mounted.

I claim:

1. A trash compactor for use within a box of a garbage collecting truck, said trash compactor comprising:

(a) a first conveyor member, to be carried generally horizontally within said box and defining a front end and a rear end and first top and bottom runs, said first top run for supporting and moving uncompacted trash from an uncompacted, trash intake end, along an intermediate, trash compacting area, to a compacted, trash unloading end;

(b) a second conveyor member, mounted in spaced overlying register with said first conveyor member at an angle relative thereto whereby said conveyor members are configured in a generally V-shape assembly, said second conveyor member also to be located within said box and defining a front end and a rear end and second upper and lower runs; said second lower run moving trash in a frontward direction, to further draw trash movably supported by said first top run toward said unloading end; said second upper run moving trash in a rearward direction, whereby a compacted trash discharge channel is defined between said front ends of said first and second conveyor members, and whereby said V-shape assembly defines an inner V-shape throat with a large uncompacted trash intake mouth at one end and a narrow, said discharge channel at its opposite end, said trash being progressively wedge-compacted within said V-shape inner throat as said trash moves from said intake mouth toward said discharge channel of said V-shape conveyor members assembly;

(c) first biasing means, for biasing at least part of said compacted trash exiting from said discharge channel toward and over said second conveyor member front end and onto said second upper run, whereby said compacted trash will be moved from said front and towards said rear end of said second conveyor member; and (d) second biasing means, for biasing said compacted trash on said second upper run at said rear end of said second conveyor member toward and into a first storage area, located at a distance from said conveyor members and to be housed within said garbage box.

* * * * *